United States Patent [19]

Schmidt

[11] Patent Number: 5,560,569
[45] Date of Patent: Oct. 1, 1996

[54] AIRCRAFT THERMAL PROTECTION SYSTEM

[75] Inventor: Ronald P. Schmidt, Crowley, Tex.

[73] Assignee: Lockheed Corporation, Fort Worth, Tex.

[21] Appl. No.: 418,104

[22] Filed: Apr. 6, 1995

[51] Int. Cl.$^6$ ................................................. B64G 1/00
[52] U.S. Cl. ........................ 244/117 R; 244/158 A; 244/121; 244/117 A; 428/116; 428/117; 52/573.1; 404/47
[58] Field of Search .................. 89/36 A; 244/158 A, 244/117 R, 121, 117 A; 428/116, 117, 118; 52/573.1; 404/47, 49, 50, 74

[56] References Cited

U.S. PATENT DOCUMENTS

| | | |
|---|---|---|
| 2,477,852 | 8/1949 | Bacon . |
| 4,456,208 | 6/1984 | Mac Conochie et al. ........... 244/158 A |
| 4,756,943 | 6/1988 | Koletzko ................................. 428/116 |
| 4,925,134 | 5/1990 | Keller et al. . |
| 5,216,886 | 6/1993 | Ewing . |

OTHER PUBLICATIONS

Product Brochure, "Rohacell PMI–Rigid Foam" by Rohm Tech, Inc.
Product Brochure, "Typical Application" by Haynes International, Inc. 1991.
Product Brochure, "High Thermal Performance (HTP)", by Lockheed Missiles & Space Company.
One page Brochure, "Cross Section of DURAFRSI" by NASA Ames Research Center.
One page Brochure, "Bimetal Silica Sandwich Panel" by ROHR Industries, Inc.

*Primary Examiner*—Andres Kashnikow
*Assistant Examiner*—Tien Dinh
*Attorney, Agent, or Firm*—James E. Bradley

[57] ABSTRACT

A method and apparatus are disclosed for providing an aircraft thermal protection system for hypersonic cruise and space launch vehicles. A flexible outer skin formed from a metal super alloy is designed to flex and accommodate thermal growth in the vehicle structure. The flexible super alloy skin is made from a plurality of hexagonal shaped cups which are welded together at the edges in a honeycomb type of array with thermal expansion gaps provided between the outermost surfaces of the hexagonal cups. Gap covers extend across the thermal expansion gaps to reduce aerodynamic drag. The flexible outer skin extends over hexagonal shaped, high temperature ceramic blocks, which provide both an insulation layer and support for the outer skin. The flexible outer skin distributes airloads across various ones of the rigid ceramic blocks. A strain isolation pad extends across the ends of the blocks, opposite the flexible outer skin, to absorb strains induced by thermal expansion of the ceramic blocks and the materials beneath. A closed cell foam sheeting extends adjacent to the strain isolation pads, opposite the ceramic blocks, to provide a moisture barrier for preventing liquid formation and freezing on cryogenic fuel tanks. A thin super alloy backing foil extends along the closed cell foam sheeting, opposite the strain isolation pads. The flexible outer skin is secured to the backing foil by super alloy rods.

18 Claims, 4 Drawing Sheets

AIRCRAFT THERMAL PROTECTION SYSTEM

BACKGROUND OF THE INVENTION

1. Field of the Invention

The present invention relates in general to insulation for exterior surfaces of aircraft, and in particular to airframe components for preventing thermal transfer through the exterior surfaces of aircrafts, such as hypercruisers and space launch vehicles.

2. Description of the Prior Arts

Prior art thermal protection systems include high temperature ceramic insulation blocks, or tiles, such as those used on the current reusable space shuttle orbiters Columbia, Challenger, Discovery and Atlantis to protect the shuttles during re-entry into the earth's atmosphere. These ceramic blocks are made from rigid fibrous high temperature ceramic materials which are brittle. Other prior art thermal protection systems have included standard insulation components covered by exterior metal panels. The exterior metal panels are joined together with sliding interfaces for accommodating thermal expansion of the exterior metal panels. The sliding interfaces between the metal panels are not sealed. Metal panels also tend to be relatively heavy, adding additional weight to the vehicle.

These types of prior art thermal protection systems are generally inadequate for use on the new hypersonic cruisers and space launch vehicles being currently developed, especially those which use cryogenic fuels. Liquid air and liquid oxygen will form on cryogenic fuel tank surfaces due to super cooling of atmospheric air. Also, new hypersonic cruisers and space launch vehicles will pass through the earths atmosphere at speeds in excess of Mach 6, and friction resulting from the aircraft travelling through the atmosphere will generate high temperatures on exterior surfaces of the aircraft.

A primary problem with prior art thermal protection systems is providing a moisture barrier over the range of temperatures encountered by these new aircraft. Currently, the ceramic blocks being used on the space shuttles have to be chemically retreated and reglazed after each flight in order to assure an adequate measure of waterproofing for a single flight. Deterioration of the moisture proofing for ceramic blocks will cause severe icing problems on cryogenic fuel tanks. There are also gaps or void spaces between the blocks to allow adequate room for thermal expansion of the high temperature ceramic materials from which the blocks are made. Moisture and other atmospheric constituents can travel inward along the spaces between the blocks.

Another problem is that the necessary thermal expansion spaces between ceramic blocks will create turbulence and excessive aerodynamic drag at airspeeds of Mach 6 and higher, causing a severe drag penalty for hypersonic cruise vehicles. Prior art metal panels having sliding interfaces have not been combined with prior art ceramic blocks because of incompatible coefficients of thermal expansion between the high temperature ceramic materials and the prior art metal panels. Since high temperature ceramic blocks are brittle, durability also will be a problem if the ceramic blocks are used for the outer surfaces of hypersonic cruise and space launch vehicles.

SUMMARY OF THE INVENTION

A method and apparatus provide an aircraft thermal protection system for hypersonic cruise and space launch vehicles. A flexible outer skin formed from a metal super alloy is designed to flex and accommodate thermal growth in the vehicle structure. The flexible super alloy skin is made from a plurality of hexagonal shaped cups which are welded together at the edges in a honeycomb type of array with thermal expansion gaps provided between the outermost surfaces of the hexagonal cups. Gap covers extend across the thermal expansion gaps to reduce aerodynamic drag. The flexible outer skin extends over hexagonal shaped, high temperature ceramic blocks, which provide both an insulation layer and support for the outer skin. The flexible outer skin distributes airloads across various ones of the rigid ceramic blocks. A strain isolation pad extends across the ends of the blocks, opposite the flexible outer skin, to absorb strain induced by thermal expansion of the ceramic blocks and the materials beneath. A closed cell foam sheeting extends adjacent to the strain isolation pads, opposite the ceramic blocks, to provide a moisture barrier for preventing liquid formation and freezing on cryogenic fuel tanks. A thin super alloy backing foil extends along the closed cell foam sheeting, opposite the strain isolation pads. The flexible outer skin is secured to the backing foil by super alloy rods.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
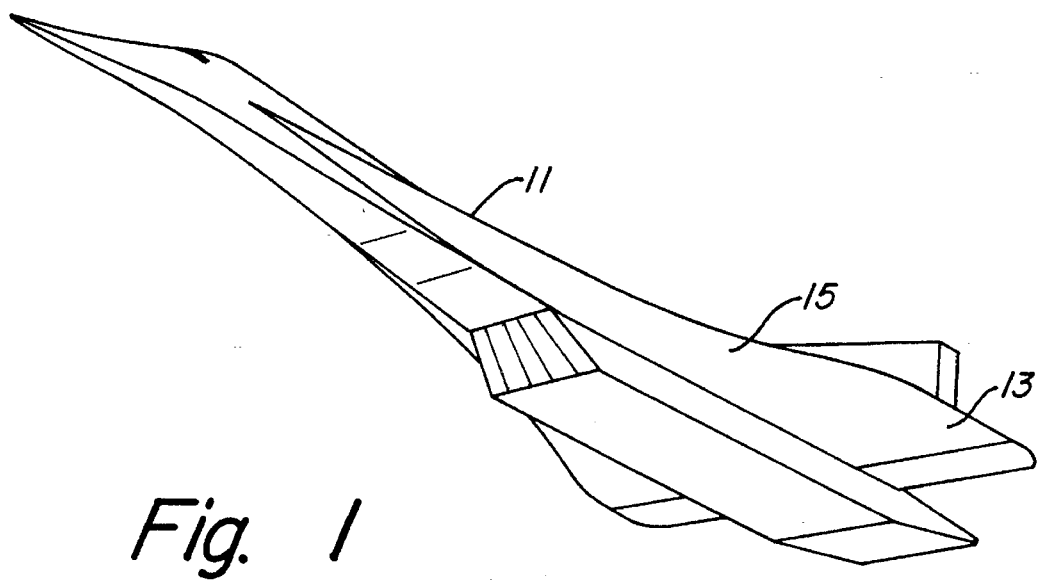
FIG. 1 depicts a perspective view of a hypersonic space launch vehicle having a thermal protection system made according to the present invention.

FIG. 1 is a perspective view of hypersonic space launch vehicle 11 having an exterior 13 which includes thermal protection system 15 of the present invention. Thermal protection system 15 prevents damage to hypersonic space launch vehicle 11 from overheating during re-entry into the earth's atmosphere, insulates vehicle 11 during hypersonic flight through the earth's atmosphere at speeds in excess of Mach 6, and prevents moisture formation and icing on the surfaces of cryogenic fuel tanks.

Figure 2:
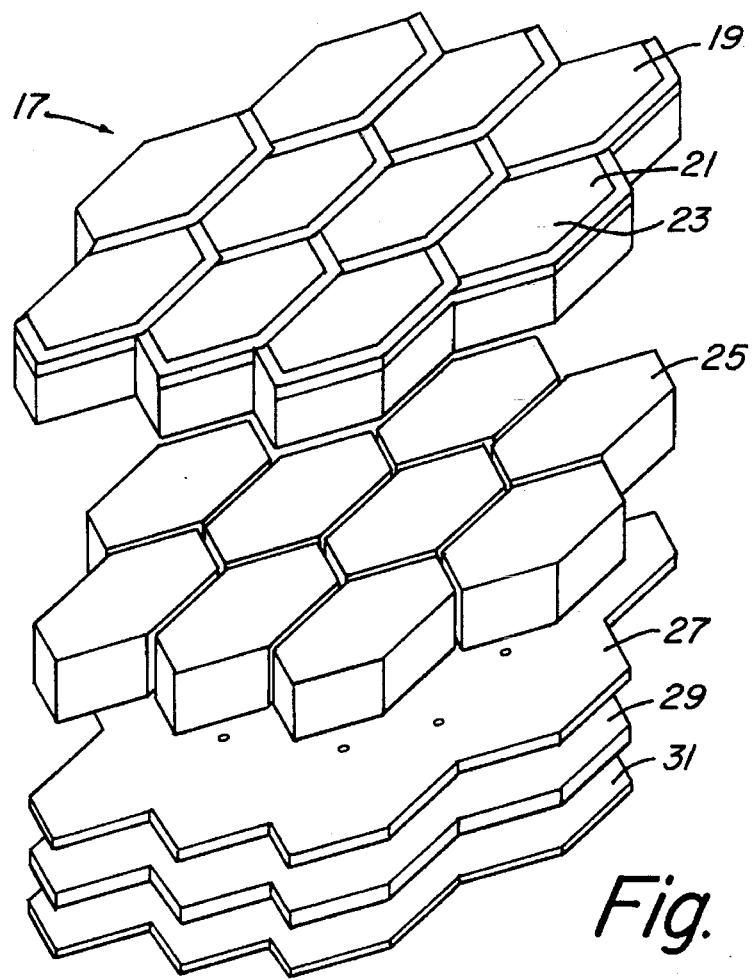
FIG. 2 is an exploded view of one of the thermal panels of a thermal protection system made according to the present invention.

FIG. 2 is an exploded view of thermal panel 17 of the thermal protection system 15. Thermal protection system 15 is formed a plurality of thermal panels 17 which are interlocked at the peripheral edges of panels 17,. Each panel 17 is a separate sealed assembly which is secured to aircraft 11, and may be mounted to the surface of a cryogenic fuel tank. Thermal panel 17 has a thin flexible outer skin 19 formed from a honeycomb type of array of a plurality of hexagonal shaped, metal cups 21. Actual production versions of thermal panel 17 may have lengths and widths such as three (3) feet by three (3) feet. Thermal panel 17 provides an insulation packet having flexible outer skin 19 formed by welding ten (10) hexagonal flexible alloy cups 21 in a honeycomb type of array.

Metal cups 21 are formed from a cobalt based, super alloy material, HAYNES alloy 188, available from HAYNES International, Inc. of Kokoma, Ind. Metal cups 21 are formed from metal sheets having a thickness of approximately five-thousandths (0,005) of an inch. Cups 21 are formed to be about nine-tenths (0.9) of an inch tall (not including skirt 39) and have a width of approximately five (5) inches across the flats on the bases for cups 21. If cups 21 are not formed into a hexagonal shape, they should preferably have at least five (5) sides for accommodating thermal expansion. Cups 21 are welded together according to Military Specifications for welding Haynes alloy 188. In the preferred embodiment, the seams between the metal cups of thermal panel 17 are sealed by welding, and the seams at the corners of the cups are sealed by reflowing a brazing material in a vacuum braze furnace. Nicrobraz 210 is used as the brazing material.

A plurality of rigid, high temperature, ceramic insulating blocks 25 extend into each of metal cups 21. Ceramic blocks 25 are made of a composite fiber-ceramic insulation material, similar to the insulation materials used on the Space Shuttle Orbiters Columbia, Challenger, Discovery and Atlantis. The composite fiber-ceramic insulation material is formed of silica and alumina fibers, boron nitride, and silicon carbide. The material used has a density of 6 pounds per cubic foot, is sold under the name HTP (High Thermal Performance), and is available from Lockheed Martin Corporation, Astronautics Division, Thermal Protection Systems Program, Orgn. 57–30, Bldg. 174, Sunnyvale, California 94088. The HTP-6 material has a compressive strength which is adequate for supporting flexible outer skin 19. Ceramic blocks 25 have a hexagonal shape, and a thickness which is larger than the height, or thickness of metal cups 21.

Strain isolation sheet 27 extends inward of ceramic blocks 25. Sheet 27 is a pad formed from an elastomeric material for absorbing strain from thermal expansion which results from differences in the coefficients of thermal expansion between flexible outer skin 19 and ceramic blocks 25.

Closed cell foam sheet 29 extends on the inward side of strain isolation pad 27. Foam sheet 29 is used to provide a moisture barrier and an additional insulation layer. It is preferable that foam sheet 29 be used within thermal panel 17 when thermal protection system 15 is being utilized over cryogenic fuel tanks to provide a moisture barrier for preventing liquid air formation and freezing. For non-cryogenic fuel tank applications, closed cell foam sheets 29 are preferably not included. In the preferred embodiment, closed cell foam sheet 29 is a lightweight, rigid polymethacrylamide foam, ROHACELL 51 WF, available from ROHM TECH INC., a Division of Rohm GmbH, 195 Canal Street, Malden, Mass. 02148. The inner surface of ceramic blocks 25, strain isolation pad 27, closed cell foam 29 and metal sheet 31 are secured together with an adhesive, such as R.T.V. number 3120 silicone made by Dow Corning.

Backing foil 31 is a metal sheet which is disposed adjacent to closed cell foam sheet 29, and provides the innermost side for thermal panel 17. Backing foil 31 is provided by three-thousandths (0.003) of an inch thick sheet of the cobalt based Haynes 188 super alloy. The periphery of backing sheet 31 is welded to the lowermost peripheral edge of flexible outer skin 19 to seal ceramic blocks 25, strain isolation pad 27 and closed cell foam pad 29 within thermal panel 17. Part of an air frame, such as a cryogenic fuel tank, is shown extending beneath thermal panel 17, and includes a carbon fiber and epoxy composite superstructure 47. Thermal panel 17 is preferably bonded to composite superstructure 47 with epoxy or R.T.V. 3120 silicone.

Figure 3:
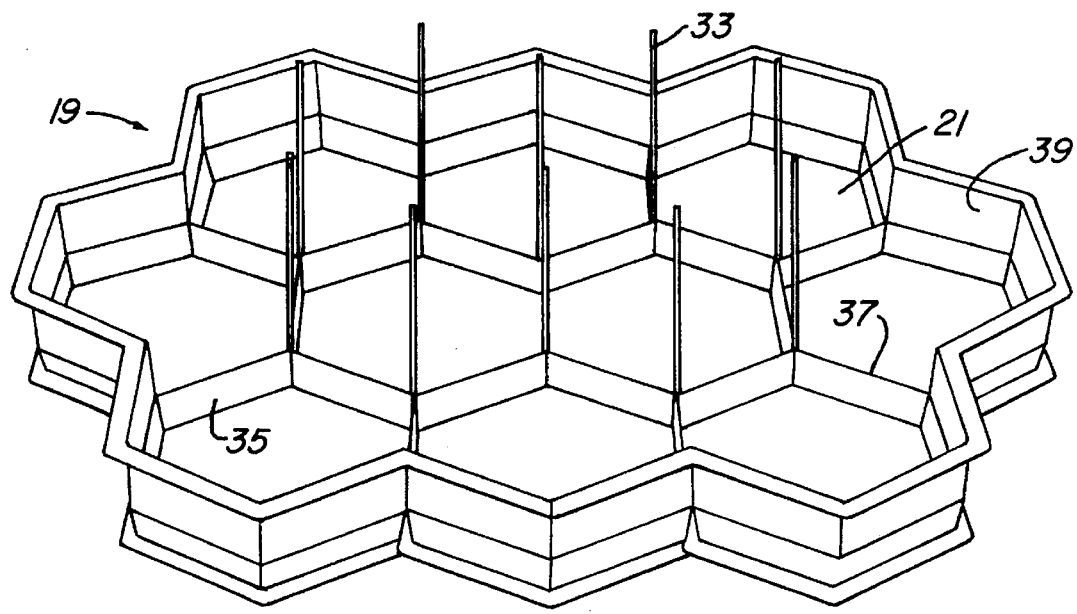
FIG. 3 is a perspective view of the interior of the flexible outer skin of the thermal panel of FIG. 2.
Figure 4:
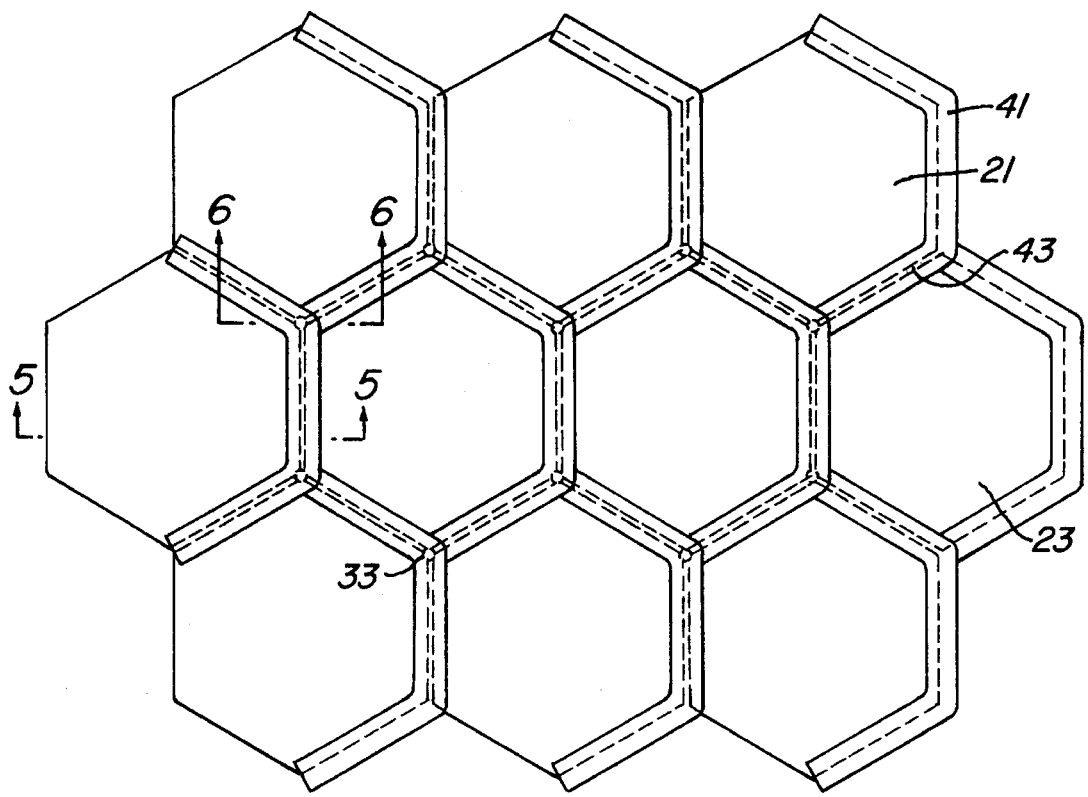
FIG. 4 is top view depicting the outermost exterior of the thermal panel of FIG. 2.

FIG. 3 is a perspective view depicting the interior of flexible outer skin 19. Thin rods 33, or wires, are welded on one end to backing sheet 31 and brazed on the other end to flexible outer skin 19 to secure skin 19 to backing 31. Rods 33 are formed from the same material as metal cups 21 and backing sheet 31, the Haynes 188 super alloy, and have diameters of forty-thousandths (0.040) of an inch. The outer ends of rods 33 are secured to metal cups 21 at the corners of edges 37 of sidewalls 35. The locations for the corner edges to which rods 33 are brazed are also shown in FIG. 4 as hidden lines depicting rods 33. The inner ends of rods 33 are welded to metal backing sheet 31, and trimmed to a length flush with sheet 31.

Edges 37 are welded along the seams to seal between cups 21. The portions of edges 37 which are disposed along the periphery of skin 19 are seam welded to skirt 39. Skirt 39 is formed from a five-thousandths (0.005) thick sheet of the same metal alloy as cups 21 are formed from. Skirt 39 is approximately one and five-eights 1⅝) inches wide. The edges of skirt 39 overlap sidewalls 35 to provide a total panel height of two and threeeights (2⅜) inches.

FIG. 4 is a top view of the outermost side of thermal panel 17. The exterior surface of thermal panel 17 is covered with a black chrome oxidation coating to enhance durability and emissivity. Thermal expansion gaps 43 (shown by hidden lines) extend between the perimeters of bases 23 of flexible alloy cups 21. Strips of metal provide gap covers 41 and are mounted to bases 23 and extend across thermal expansion gaps 43 to provide thermal expansion gap covers. Gap covers 41 are formed from five-thousandths (0.005) of an inch thick metal strips of the same cobalt based metal super alloy from which cups 21 are formed.

Figure 5:
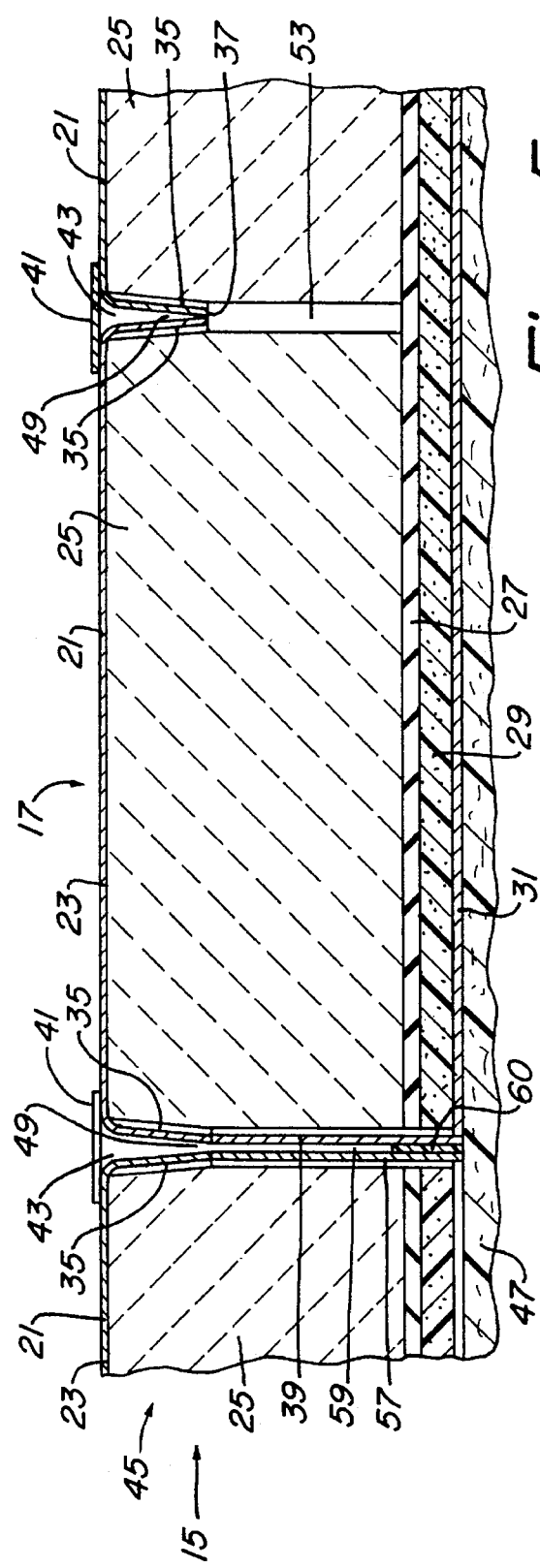
FIG. 5 is a sectional view of the thermal panel of FIG. 4 taken along section line 5—5, after the thermal panel has been mounted to an aircraft with a second thermal panel made according to the present invention.

FIG. 5 is a sectional view of thermal panel 17 of FIG. 4, taken along section line 5—5, and further depicts a sectional view of a second, adjacent thermal panel 45, which has been mounted to an aircraft with thermal panel 17. Referring to FIGS. 4 and 5, each of the metal strips of gap covers 41 are welded on one side of the strips to one of cups 21. The other side of metal strips 41 are free to slide across the base 23 of a cup 21 which is adjacent to the cup 21 to which the strip 41 is welded for accommodating thermal expansion. The thickness of ceramic blocks 25 extends from strain isolation pad 27 to base 23, perpendicular to base 23, and is greater than the height of sidewalls 35, which extend from edges 37 to base 23, perpendicular to base 23.

Figure 6:
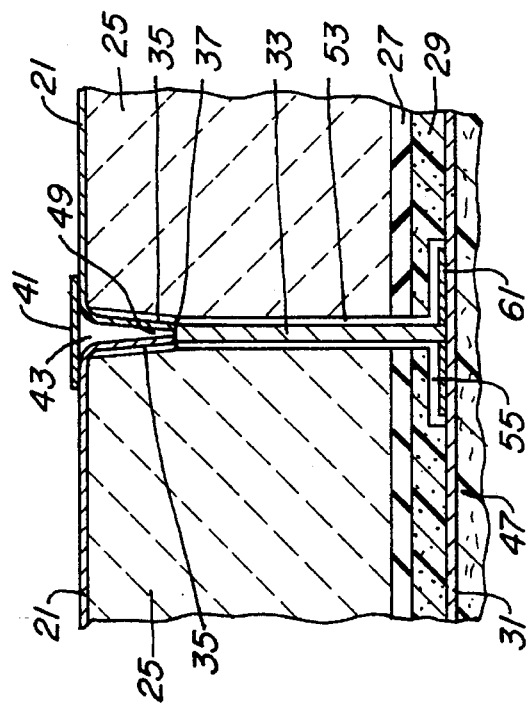
FIG. 6 is a sectional view of the thermal panel of FIG. 4, taken along section line 6—6.

FIG. 6 depicts a sectional view of thermal panel 17, taken along section 6—6 of FIG. 3. Fastening rods 33 are shown extending between the edges 37 for cups 21 and holes through metal sheet 31 to provide a fastening means for fastening flexible outer skin 19 to sheet 31. Rods 33 extend downward in the spaces between ceramic blocks 25, through holes in strain isolation pad 27 and foam sheet 29, and through metal backing sheet 31. Doubler 61 is a metal disc of the Haynes 188 super alloy which is welded to metal backing sheet 31 to provide additional thickness for securing rods 33 to sheets 31.

Referring to FIGS. 5 and 6, thermal expansion joints, or flexjoints, 49 are provided by thermal expansion gaps 43, which are depicted as V-shaped cavities which extend between sidewalls 35 of metal cups 21. Edges 37 of sidewalls 35 define open ends for metal cups 21 and face inward toward an interior of aircraft 11, superstructure 47. Bases 23 provide closed base ends for metal cups 21 which are smaller than the open ends defined by edges 37. For curved thermal panels, thermal expansion gaps 43 are still preferably V-shaped, but the sidewalls for metal cups 21 will have shapes for providing gaps 43 between adjacent metal cups. The shape for ceramic blocks 25 may also be adapted for providing thermal panels for curved surfaces. Sidewalls 35 preferably extend outward from edges 37 and will flex and expand into gaps 43 to accommodate thermal expansion of metal cup 21 at high temperatures. At ambient temperature, thermal expansion gaps 43 preferably measure twelve-hundredths (0.12) of an inch between bases 23 of sidewalls 35 for allowing adequate room for thermal expansion at operating temperatures of 1800 degrees fahrenheit and temperatures spikes in excess of 2,000 degrees fahrenheit.

Thermal expansion gaps 43 are also provided between bases 23 of metal cups 21 for adjacent thermal panels 17, 45. In other embodiments of the present invention, thermal expansion gaps 43 between adjacent thermal panels 17, 45 may be replaced with straight sidewalls. Thermal expansion spaces 53, 59 are also provided between ceramic blocks 25. An RTV Filler extends in the innermost end of gap 59, to provide a moisture seal between the inner ends of skirts 39, 57 of thermal panels 17, 45, respectively.

Thermal panel 17 provides a sealed, high temperature, aerodynamic insulation pack having a plurality of high temperature ceramic insulation blocks 25 sandwiched between two layers of the cobalt based metal super alloy, flexible skin 19 and metal sheet 31. Skin 19 and sheet 31 are sealed by seam welding one edge of skirt 39 to the edges of cups 21 disposed along the perimeter of panel 17, and seam welding the other edge of skirt 39 to the peripheral edge of thin sheet of metal foil 31. The brazing material is applied to reinforce the seal at the corners of metal cups 21. Flexible outer skin 19 is stretched over ceramic blocks 25, with one of blocks 25 extending into each of the metal cups 21. Ceramic blocks 25 are rigid and support flexible outer skin 19.

Figure 7:
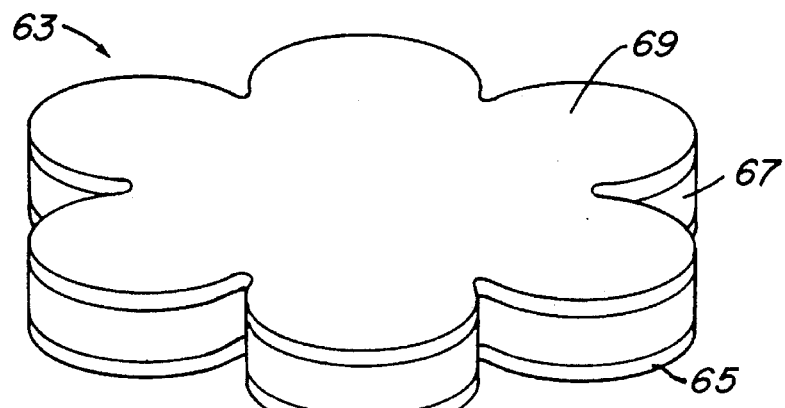
FIG. 7 is a perspective view illustrating a forming material assembly of a blank of the super alloy metal for forming into one of the hexagonal metal cups, prior to forming and after it has been placed beneath a sacrificial caul sheet and a urethane pad to prevent damage to the blank during forming.
Figure 8:
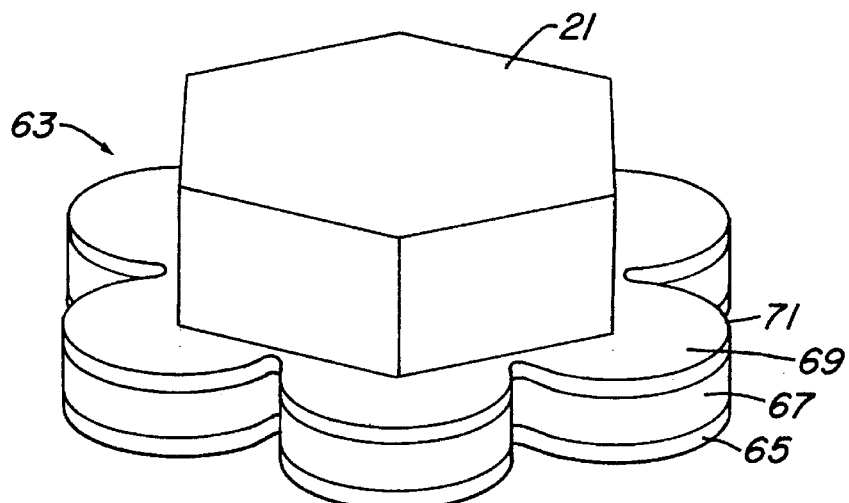
FIG. 8 is a perspective view of the metal cup forming assembly of FIG. 7, after forming the metal cup into the hexagonal shape.

FIGS. 7 and 8 are a perspective view of forming assembly 63 which is assembled for draw forming metal cups 21 into the hexagonal shape. Sheet 65 of Haynes 188 super alloy material is five-thousandths (0.005) of an inch thick prior to forming cups 21. Sheet 65 is placed adjacent to a fifty-thousandths (0.050) of an inch thick aluminum caul plate 67, formed of a 2024-TO aluminum sheet. A urethane pad 69 is placed adjacent to caul plate 67, opposite of metal sheet 65, to provide forming assembling 63. Aluminum sheet 67 is a sacrificial caul sheet which is utilized to minimize wrinkling of metal cups 21 during forming. Additionally, lubrication may be applied to the various components to aid in the forming process, but preferably not between caul plate 67 and alloy Sheet 65.

Forming assembly 63 is then placed in a hydraw press, with the urethane pad, which is adjacent to aluminum caul sheet 67, located next to a rubber head for the press. Metal sheet 65 will then be adjacent to a ring which moves in relation to a hexagonal shaped forming die, which is within the ring, to draw the central portion of assembly 63 over the forming die, as the rubber head moves to form the central portion of assembly 63 into a hexagonal cup shape. Urethane pad 69 is then removed, and aluminum caul sheet 67 is disposed of. Edges 71 of metal cup 21 are then trimmed. Hexagonal shaped metal cup 21 is then aligned with and welded to other hexagonal shaped metal cups 21 to provide a flexible outer skin 19.

Figure 9:
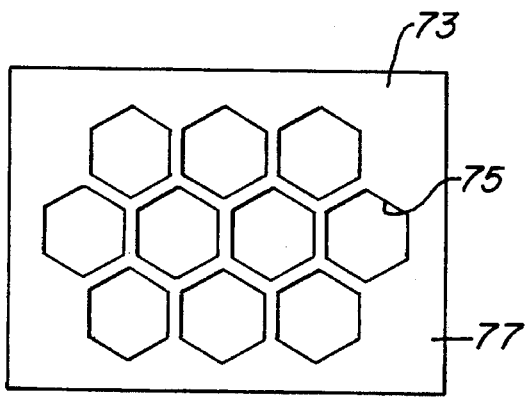
FIG. 9 is a top view of an assembly fixture for use in assembling the plurality of metal cups into a hexagonal array of the metal cups.

FIG. 9 depicts assembly fixture 73 which is utilized for assembling metal cups 21. Assembly fixture 73 is made by cutting ten hexagonal shaped holes 81 into aluminum plate 77. Holes 75 are spaced apart in assembly fixture 73 an appropriate distance for controlling the widths of gaps 43 between metal cups 21 as they are welded together into the honeycomb array. As shown, plate 77 is flat. In other embodiments, assembly fixtures may be formed from plates which are curved to match the curvature of the exterior of an aircraft to which a thermal panel is to be mounted.

Figure 10:
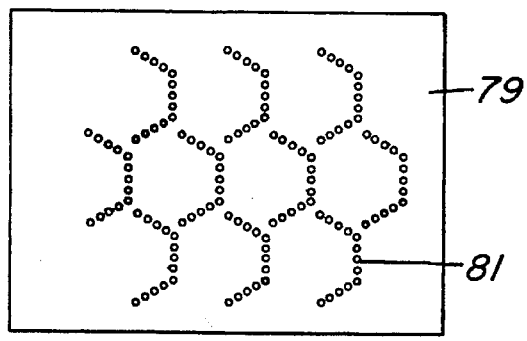
FIG. 10 is a top view of a template used for designating the locations at which gap covers are spot welded to a honeycomb type array of the hexagonal cups to cover the thermal expansion gaps between the hexagonal cups.

FIG. 10 depicts mylar template 79 which is utilized for determining at which points the gap cover webbing 41 is tack-welded to the assembly of metal cups 21 (shown in FIG. 4). Template 79 has holes 81 which locate the points for tack welding gap cover 41.

The present invention provides several advantages over prior art thermal protection systems. The present invention provides a reusable, lightweight, durable thermal protection system for use at temperatures of 2,000 degrees fahrenheit. A thermal protection system according to the present invention may be utilized to insulate cryogenic fuel tanks to prevent liquid air formation and icing on the aircraft. The present invention provides an insulating moisture barrier which does not have to be retreated after each flight. Additionally, a smooth aerodynamic outer surface is provided to reduce turbulence and aerodynamic drag during flight.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

I claim:

1. An apparatus for preventing thermal transfer through an exterior of an aircraft, the apparatus comprising in combination:

a flexible outer skin formed from a plurality of metal cups having open ends which face inward toward an interior of the aircraft, and closed base ends which are smaller than the open ends and which face outward and away from the interior of the aircraft, sidewalls which are joined with the sidewalls of adjacent metal cups with the base ends spaced apart with thermal expansion gaps extending therebetween;

rigid insulation formed from a plurality of ceramic blocks which are spaced apart and have outer ends which extend into the open ends of the metal cups, wherein the flexible outer skin extends over the ceramic blocks and retains the ceramic blocks against the interior of the aircraft; and an inner barrier extending across the inner ends of the blocks to block moisture transfer.

2. The apparatus according to claim 1, wherein:

the inner barrier includes a metal liner; and fastening means extends between the metal liner and the metal cups to fasten the metal cups to the metal liner.

3. The apparatus according to claim 1, wherein:

the inner barrier includes a thermoplastic liner;

the inner barrier further includes metal liner disposed opposite the thermoplastic liner from the inner ends of the blocks; and rods extend between the metal liner and the metal cups to fasten the metal cups to the metal liner.

4. The apparatus according to claim 1, wherein the sidewalls of the adjacent metal cups are joined at inner edges.

5. The apparatus according to claim 1, wherein the sidewalls of the adjacent metal cups are joined at inner edges, with the thermal expansion gaps extending between outer portions of the sidewalls and adjacent ones of the base ends of the metal cups.

6. The apparatus according to claim 1, wherein:

the sidewalls of the adjacent metal cups are joined at inner edges of the sidewalls, with the thermal expansion gaps extending between outer portions of the sidewalls and adjacent ones of the base ends of the metal cups; and cover strips extend over the thermal expansion gaps, each cover strip welded to only one base of one cup to allow expansion and contraction of the thermal expansion gaps.

7. The apparatus according to claim 1, wherein the metal cups have at least five (5) sidewalls.

8. The apparatus according to claim 1, wherein the blocks have a greater thickness than the height of the sidewalls.

9. An apparatus for preventing thermal transfer through an exterior of an aircraft, the apparatus comprising in combination:

a plurality of metal cups having open ends which face inward toward an interior of the aircraft, closed base ends which are smaller than the open ends and which face outward and away from the interior of the aircraft, and each cup having at least five (5) sidewalls which are joined at inner edges with the sidewalls of adjacent metal cups, with outer portions of the sidewalls and the base ends spaced apart with thermal expansion gaps extending therebetween;

a plurality of rigid ceramic insulation blocks which are spaced apart and have outer ends which extend into the open ends of the metal cups, wherein metal cups extend over the outer ends of the blocks, and the blocks have a thickness which is greater than the height of the sidewalls for the metal cups;

a thermoplastic liner extending inward of and parallel to inner ends of the blocks;

a metal liner extending inward of the thermoplastic liner, and parallel to the inner ends of the blocks, for blocking moisture transfer; and rods extending between the metal liner and the metal cups to fasten the metal cups to the metal liner.

10. The apparatus according to claim 9, wherein the rods are secured to the inner edges of the sidewalls of the metal cups.

11. The apparatus according to claim 9, further comprising:

cover strips extending over the thermal expansion gaps, each cover strip welded to only one base of one cup to allow expansion and contraction of the thermal expansion gaps.

12. The apparatus according to claim 9, wherein the inner edges of the sidewalls of the adjacent metal cups are joined by welding.

13. The apparatus according to claim 9, wherein at least a portion of the inner edges of the sidewalls of the adjacent metal cups are sealed by brazing.

14. The apparatus according to claim 9, further comprising:

an elastomeric pad extending between the inner ends of the blocks and the thermoplastic liner for absorbing and distributing strain which result from thermal expansion.

15. The apparatus according to claim 9, wherein thermoplastic liner comprises a closed cell foam pad.

16. An apparatus for preventing thermal transfer through an exterior of an aircraft, the apparatus comprising in combination:

a plurality of metal cups having open ends which face inward toward an interior of the aircraft, closed base ends which are smaller than the open ends and which face outward and away from the interior of the aircraft, and each cup having at least five (5) sidewalls which are joined at inner edges with the sidewalls of adjacent metal cups with outer portions of the sidewalls and the base ends spaced apart with thermal expansion gaps extending therebetween;

a plurality of rigid ceramic insulation blocks which are spaced apart and have outer ends which extend into the open ends of the metal cups, wherein metal cups extend over the outer ends of the blocks, and the blocks have a thickness which is greater than the height of the sidewalls for the metal cups;

a thermoplastic liner extending inward of and parallel to the inner ends of the blocks;

a metal liner extending inward of the thermoplastic liner, and parallel to the inner ends of the blocks for blocking moisture transfer;

rods extending between the metal cups and the metal liner and having outer ends which are secured to the inner edges of the metal cups, and to the metal liner to fasten the metal cups to the metal liner; and cover strips extending over the thermal expansion gaps, each cover strip welded to only one base of one cup to allow expansion and contraction of the thermal expansion gaps.

17. The apparatus according to claim 16, wherein:

at least a portion of the inner edges of the sidewalls of the adjacent metal cups are joined by welding.

18. The apparatus according to claim 16, further comprising:

an elastomeric pad extending between the inner ends of the blocks and the thermoplastic liner for absorbing and distributing strain which result from thermal expansion; and wherein thermoplastic liner comprises a closed cell foam pad.

* * * * *